C. TYSON.

Water Tube Boiler.

No. 8,062. Reissued Jan. 29, 1878.

Attest:

J. Bonsall Taylor

Samuel Westerfield Jr.

Inventor

Charles Tyson by W. C. Strawbridge

Atty.

THE NORRIS PETERS CO., WASHINGTON, D. C.

UNITED STATES PATENT OFFICE.

CHARLES TYSON, OF PHILADELPHIA, PENNSYLVANIA.

IMPROVEMENT IN WATER-TUBE BOILERS.

Specification forming part of Letters Patent No. 196,844, dated November 6, 1877; Reissue No. 8,062, dated January 29, 1878; application filed December 7, 1877.

*To all whom it may concern:*

Be it known that I, CHARLES TYSON, of the city and county of Philadelphia, and State of Pennsylvania, have invented a new and useful Improvement in Steam-Generators, which improvement is fully set forth in the following specification.

My invention relates to pipe steam-generators for engines, and the mode of automatically feeding the same with water; and consists in the use of a supplemental pressure equal to the working-pressure of the motor, which pressure may be induced by an air-chamber, hydrant, or equivalent, to automatically feed water to the generating-pipe during the operation of the motor, so that upon the stoppage of the motor subsequent generation of steam shall expel the water from the generating-pipe, and thus further generation of steam be prevented while the motor is at rest. The said air-chamber, when employed in connection with the generating-pipe, should be of such capacity as to receive and contain the contents of the generator, expelled as above described.

It further consists in the combination of parts, hereinafter described, in which is employed a supplemental pressure-supply for a steam-generator by means of an air-chamber, forcing water to a generating-coil, in which it is vaporized, and from and through which it is conveyed to the steam-chest of the engine for useful work.

The supply to the engine is controlled by means of a throttle. A submerged pump, operated by the engine, supplies water to the air-chamber, from which it is forced to the coil, a spring-controlled outlet-valve in the pipe between the pump and air-chamber regulating the supply.

Figure 1:
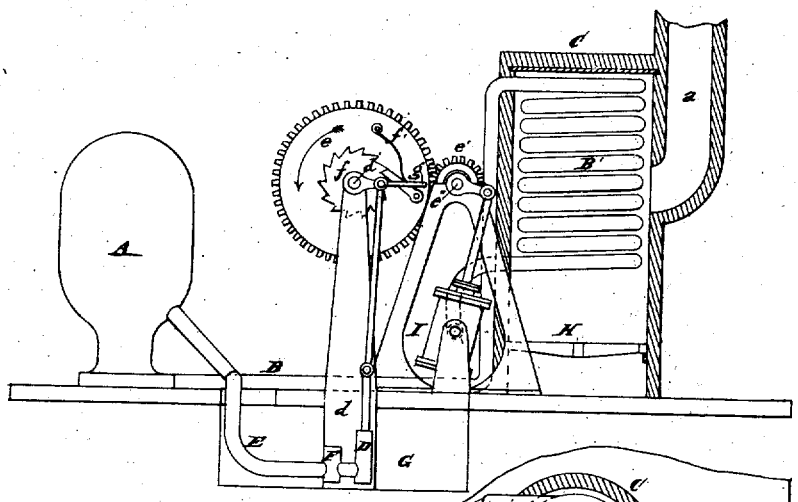
Figure 2:
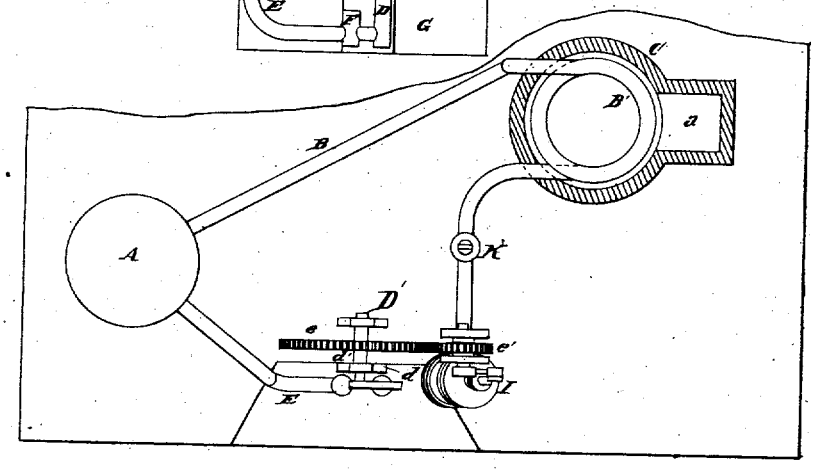

In the drawings, Figure 1 is a vertical longitudinal view of the invention, and Fig. 2 a plan view of the same.

A is the air-pressure chamber, connecting with the pipe B, the coiled portion B′ of which is inclosed in the furnace of case C, having the flue *a* and grate H.

The heating medium may be petroleum or other gas-generating fluid, or other suitable combustible material, and the chamber of the grate or burner will depend upon the nature of the fuel employed.

E is the pipe leading to the chamber A from the pump D, which is submerged in the tank G.

On water being fed to the chamber A it compresses its contained air to a suitable degree, and flows into the coil B′ of the furnace C. In its passage through the coil B′ it is evaporated by heat, and passes to the engine (represented by I) in the condition of steam.

K is a throttle, by means of which the steam can be regulated in its flow to the engine.

In case the supply of water should exceed the amount required, the spring-valve F will open outwardly and discharge the surplus into the tank G.

The pump is provided with mechanism whereby it may be operated independently of the engine. The pump D is supported on a standard, *d*, its shaft *d′* having a bearing therein and in the supplemental standard D′.

The spur-wheel *e*, driven by the pinion *e′* on the engine-shaft *e″*, is loose upon the pump-shaft, but connected therewith by means of the ratchet-wheel *f*, which is tight on the pump-shaft, and the spring-pawl *f′*, pivoted to an arm of the spur-wheel *e*.

The crank of the pump is extended so as to form a crank-handle, *g*, by means of which the pump may be worked by hand independently of the engine.

I do not limit myself to the particular mechanical devices herein shown and described, or the arrangement and combination of the same; but I set them forth as an advantageous combination of mechanical devices for the embodiment of my invention.

It will be readily understood that a supplemental pressure may be induced and applied by an air-chamber, loaded piston, or hydrant, or other equivalent device; that a straight generating-pipe instead of a coil-pipe may be employed; and that the form and arrangement of the furnace C may be varied to suit the requirements of the fuel used.

I claim as my invention—

1. The mode of feeding water to a pipe steam-generator, which consists in the use of a supplemental pressure equal to the working-pressure of the motor, induced by an air-chamber, hydrant, or equivalent, to automatically feed water to the generating-pipe during the operation of the motor, so that upon the stoppage of the motor subsequent generation of steam shall expel the water from the generating-pipe, and thus further generation of steam be prevented while the motor is at rest, substantially as described.

2. In a pipe steam-generator, the combination of a water supply or reservoir, G, pipe E, pumps D, air-chamber A, generating-pipe B B′, and furnace H, substantially as shown and described, and for the purposes set forth.

CHARLES TYSON.

Witnesses:
W. C. STRAWBRIDGE,
J. BONSALL TAYLOR.